UNITED STATES PATENT OFFICE.

JOHN L. KIDWELL, OF WASHINGTON, DISTRICT OF COLUMBIA.

IMPROVED COMPOSITION FOR PAVEMENTS, ROOFING, DRAIN-PIPES, &c.

Specification forming part of Letters Patent No. 90,106, dated May 18, 1869.

*To all whom it may concern:*

Be it known that I, JOHN L. KIDWELL, of Washington, District of Columbia, have invented a new Composition for Pavements, or for roofing purposes, for drain-pipes, for covering cellar and stable floors, protecting wharves against the action of water, lining wells and sewers, &c.

To enable others skilled in the art to make and use my compound, I will proceed to describe it.

I take forty pounds asphalt, fifteen pounds coal-tar or pine-tar, five pounds sulphur, forty-five pounds lime, three hundred pounds sand, fine gravel, ground iron cinder, and iron slag, ninety-five pounds coal-ashes, one hundred pounds powdered clay, and a sufficient quantity—say, from five to twenty pounds—of kitchen-salt.

These quantities must necessarily vary according to seasons and climate at or in which my discovery is put into practical use; and hence I do not limit myself to these or any proportions.

I proceed as follows: First, the coal-tar and asphaltum are heated together as long as watery vapors are given off; then the sulphur is added, either in powder form or dissolved in oil of turpentine, linseed-oil, or naphtha, the mass being boiled some time under constant agitation or stirring. Second, I next mix freshly-slaked lime with heated sand, coal-ashes, fine gravel, iron cinder, iron slags, clay, and common salt, and incorporate and stir whole into the melted-tar compound mentioned under head 1. The mixed compound is then spread upon the ground, previously well prepared, and rolled with heavy iron rollers.

Having thus described my invention, what I claim is—

The improved composition for pavements and roofing, as above described and set forth.

JNO. L. KIDWELL.

Witnesses:
 EDM. F. BROWN,
 A. L. MERRIMAN.